United States Patent [19]
Fujii et al.

[11] Patent Number: 6,049,839
[45] Date of Patent: Apr. 11, 2000

[54] DATA PROCESSOR WITH MULTIPLE REGISTER QUEUES

[75] Inventors: Hiroaki Fujii, Kokubunji; Yasuhiro Inagami, Kodaira; Shigeo Takeuchi, Hanno, all of Japan

[73] Assignees: Hitachi, Ltd.; Hitachi ULSI Engineering Corporation, both of Tokyo, Japan

[21] Appl. No.: 08/172,170

[22] Filed: Dec. 23, 1993

[30] Foreign Application Priority Data

Dec. 29, 1992 [JP] Japan ..................................... 4-360067

[51] Int. Cl.$^7$ ...................................................... G06F 13/00
[52] U.S. Cl. ................................................................ 710/1
[58] Field of Search ............................ 364/161; 395/800; 710/1

[56] References Cited

U.S. PATENT DOCUMENTS 5,134,562  7/1992  Hattori et al. ........................... 395/400
5,148,542  9/1992  Sakuma et al. .......................... 395/700

OTHER PUBLICATIONS

Hironaka et al. of Kyushu University, "Benchmarking a Vector–Processor Prototype Based on Multithreaded Streaming/FIFO Vector (MSFV) Architecture", International Conference on Supercomputing, 1992.

J. H. Hennessy and D.A. Patterson, "Computer Architecture: A Quantitative Approach", Morgan Kaufmann Publishers, Inc., 1990 pp. 450–454.

Hideo Wada, Shun Kawabe, Toshihiko Odaka "Hitachi supercomputer S–820 overview", proceeding of Supercomputing Europe '89, pp. 139–147.

P.Tirumalai, M.Lee, and M.Schlansker: Parallelization of Loops with Exits on Pipelined Architectures, Proceedings of Supercomputing '90, pp. 200–212 (1990).

K. Murakami: Hyperscaler Processor Architecture–The Fifth Approach to Instruction–Level Parallel Processing, JSPP '91 Proceedings, pp. 133–140 (1991).

Wm.A.Wulf: Evaluation of the WM Architecture, Proceedings of the 19th Annual ISCA, pp. 382–390(1992).

J.C.Dehnert, P.Y. T.Hsu, and J.P.Bratt: Overlapped Loop Support in the Cydra 5, ASPLOS –III Proceedings, pp. 26–38 (1989(.

H.Nakamura, H.Imori, K.Nakazawa, T.Boku, I.Nakata, Y.Yamashita, H.Wada, and Y. Inagami: A Scalar Architecture for Pseudo Vector Processing based on Slide–Windowed Registers, Conference Proceedings of 1993 International Conference on Supercomputing, pp. 298–307(1993).

*Primary Examiner*—Paul R. Myers
*Attorney, Agent, or Firm*—Antonelli, Terry, Stout & Kraus, LLP

[57] ABSTRACT

A data processor includes a register group having registers of the number larger than the number of registers which can be designated by a register specifier field of an instruction. The register group consists of a plurality of register queues with respect to logical register numbers designated in the instruction, each register queue including a plurality of physical registers. In the data processor, a physical register number forming section is provided for converting the logical register number to a physical register number in the register queue corresponding to the logical register number, by using queue control information designated in the register specifier field and read/write information decided by the kind of the instruction and the position of the register specifier field in the instruction.

13 Claims, 6 Drawing Sheets

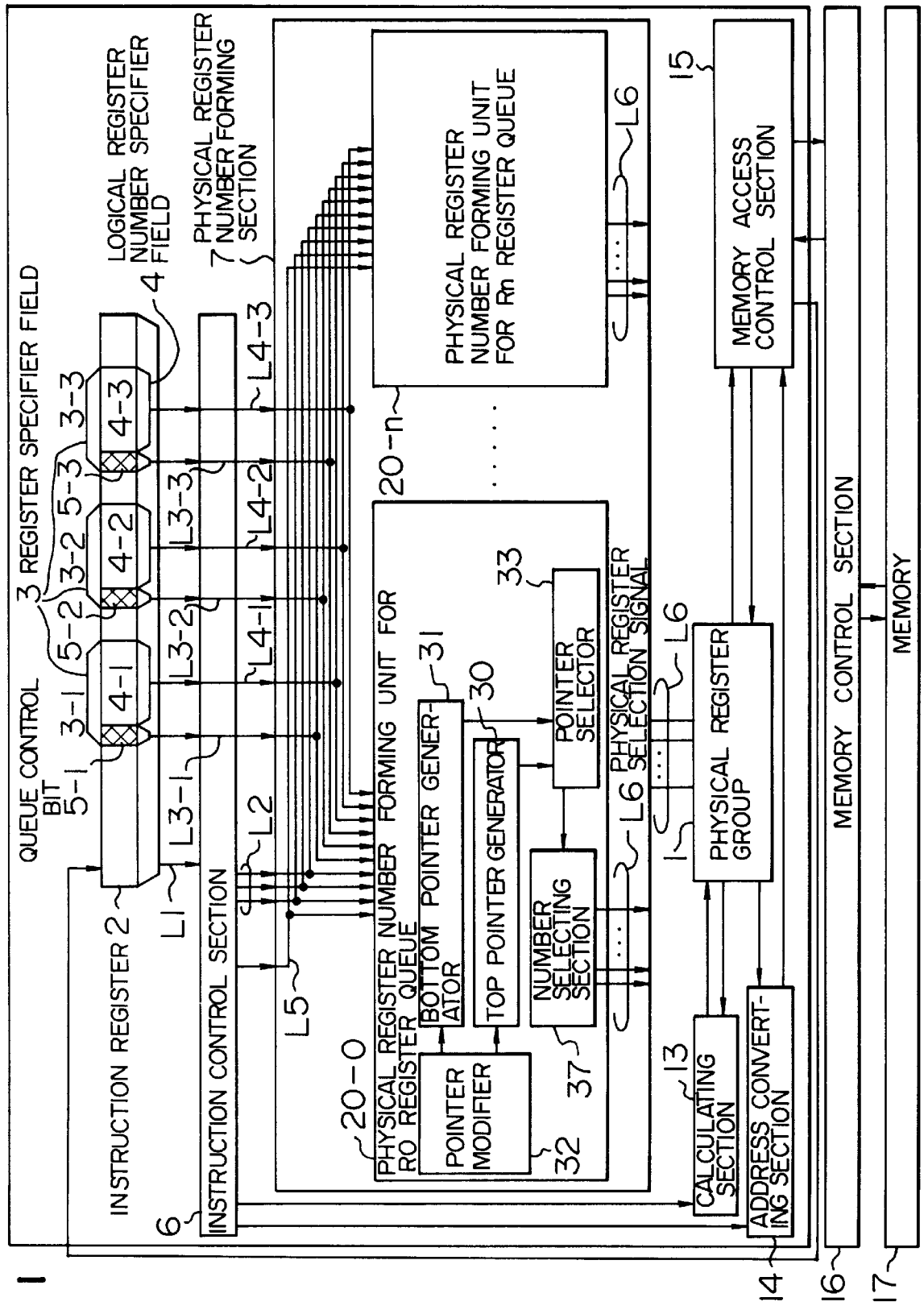
F I G. 1

DATA PROCESSOR WITH MULTIPLE REGISTER QUEUES

BACKGROUND OF THE INVENTION

The invention relates to a data processor having a plurality of registers and, more particularly, to a data processor which can execute a program at a high speed by enabling a number of registers to be used.

In association with the advancement of the recent LSI technique, an arithmetic operation processing ability of a data processor is increasing more and more. Such a data processor can be used as, for example, a microprocessor in an engineering work station. Also, a multiprocessor can be also constructed by using a number of such data processors.

The arithmetic operation processing ability of the data processor can be relatively easily improved by improving the operating frequency of the data processor or by parallel processings in the data processor. On the other hand, an accessing speed of a memory, namely, a data transfer ability between the memory and an arithmetic operating unit in the data processor cannot be improved significantly because of a delay or a limitation of the number of LSI pins which are used for a data transfer path. Therefore, since the data transfer processing ability is relatively deteriorated as compared with the arithmetic operation processing ability, the data transfer processing ability becomes a bottle neck and it is impossible to take maximum advantage of the arithmetic operation processing ability of the data processor.

A proposed method of solving the above problem is to make use of a cache memory. However, in an application field such as a large scale numerical application which handles a very large data area, the cache memory is hardly useful. A method of increasing the number of registers in the data processor has also been considered. By this method, for example, the number of times of the operations to save and restore the intermediate results of arithmetic operations occurring due to a lack of registers into the memory is reduced and a deterioration of the performance in association with such saving and restoring operations can be prevented. However, since the register is designated by a register specifier field in an instruction word of the data processor, the number of registers which can be designated by the register specifier field is set to the upper limit of the number of registers on an architecture. In order to prepare and use the number of registers exceeding such an upper limit, some expansion on the architecture is needed. The following three kinds of techniques are known as such a kind of technique.

The first kind of technique relates to a vector register which is used in a processing system in which a vector processing unit is added to a processor according to the conventional technique. The vector register can store hundreds of data in a lump. According to such a processing system, hundreds of data of the vector register can be processed by one instruction called a vector instruction only for use in the vector processing. Only a vector instruction can access the vector register. The vector register cannot be accessed by a conventional instruction. This kind of technique is used in, for instance, the supercomputer S-820 made by Hitachi Ltd. An improved technique of the first kind of technique has also been proposed in Hironaka et al. of Kyushu University, "Benchmarking a Vector-Processor Prototype Based on Multithreaded Streaming/FIFO Vector (MSFV) Architecture", International Conference on SUPERCOMPUTING, 1992. According to the processor of the MSFV system as mentioned above, efficiency is improved by making a length of the vector which is stored into the vector register variable. Further, assuming that the vector length is set to 1, the vector instruction substantially becomes a scalar instruction (conventional instruction mentioned above).

The second kind of technique is a technique called a register window wherein registers of a number that is larger than the number of registers which can be designated by a register specifier field are prepared in the data processor and those registers are combined into groups each comprising the number of registers which can be designated by the register specifier field and those groups are switched by an instruction and used. This kind of technique has been disclosed in, for example, J.L. Hennessy and D.A. Patterson, "Computer Architecture: A Quantitative Approach", Morgan Kaufmann Publishers, Inc., 1990, pages 450–454.

The third kind of technique is a technique such that the register specifier field is enlarged and the number of registers which can be designated by an instruction is increased.

According to the processing system based on the above first kind of technique, the vector processing unit is added to the processor of the conventional type and an instruction for the vector processing unit is added, so that the program formed for the processor of the conventional type can be also executed. Therefore, there is no problem in terms of the compatibility of the program. To realize such a processing system, however, a very large scale of hardware is needed. Further, with regard to the portion in which the vector processing of the program cannot be realized, since the processing is performed in the processor by the conventional technique, the vector register cannot contribute to solve the lack of registers in such a portion.

On the other hand, in the case where one data (scalar data) which is obtained as a result of arithmetic operation executed by the processor according to the conventional technique is used in a vector processing unit, it is necessary to transfer data from the register in the processor according to the conventional technique to the scalar register in the vector processing unit. Such a processing becomes an overhead. It is, however, considered that such a problem can be solved to a certain extent in a processor based on the MSFV system as an improved technique of the first kind of technique.

According to the second kind of technique, it is possible to reduce the overhead in association with the memory access that is necessary to save the register when a subroutine is called or to restore the register at the time of returning from the subroutine. However, while one subroutine is being executed in spite of the fact that the number of registers in the processor was increased, since the number of registers which can be used is unchanged, the memory access to temporarily write or read out the intermediate result of the calculation into/from the memory cannot be reduced. According to the above technique, therefore, although the performance of the program in which the number of calling times of the subroutine can be improved, it is impossible to improve the performance in a program such that a frequency of the subroutine calling times is small as in a large scale numerical application and the execution of a loop such as to repeat the same calculation with respect to each element of a large scale array occupies most of the executing time.

Particularly, in a data processor such that it has a calculation pipeline in order to make an arithmetic operation processing speed high, it is desirable to realize a loop unrolling (unfolding of the loop iteration in a source code) of the number as many as the number (n) of stages of the calculation pipeline in order to improve a use efficiency of the arithmetic operation unit in the processing of the loop which repeats the array calculation. In this case, however, as the number of registers to store the array elements, it is necessary to use the registers of the number that is n times as large as the number of registers in the case where the unrolling is not realized. The number of registers which can be used per execution of the loop is substantially 1/n of the number of registers. According to the second kind of technique, as mentioned above, in spite of the fact that the number of registers in the data processor was increased by n times, the number of registers which can be used at a certain time point is still equal to that when this technique is not used, so that insufficiency of registers is unchanged.

In the above third kind of technique, it is necessary to significantly change the instruction set in order to enlarge the register specifier field in the instruction word. Consequently, there occurs a problem on a program compatibility such that the program formed for the processor of the conventional type cannot be executed.

SUMMARY OF THE INVENTION

It is an object of the invention to provide a data processor which can perform high speed processing of a large scale scientific application by increasing the number of physical registers which can be accessed from an ordinary instruction without adding a large scale hardware, and while maintaining compatibility with conventional architecture.

To accomplish the above object, according to the invention, in a processor of the Neumann type, a register group comprising registers of the number that is larger than the number of registers which can be designated by a register specifier field of an instruction is provided. Further, the register group is constructed by a plurality of register queues, each queue comprising a plurality of physical registers. The register queue exists with respect to each logical register number that is designated by the register specifier field of an instruction and the processor has a physical register number forming section to designate a physical register in the register queue. The physical register number forming section designates the physical register in the register queue by using the logical register number that is designated by the register specifier field and a read/write control signal for the register which is decided by the kind of the instruction and the position of the register specifier field in the instruction.

Queue control information is provided in the register specifier field of the instruction. The designation format of the physical register in the register queue is changed in accordance with the contents of the queue control information.

When the logical register number is designated in the register specifier field of the instruction, a logical register selection signal and the read/write control signal are supplied to a physical register number forming section corresponding to the logical register number. The physical register in the register queue is selected on the basis of those signals. In the case where queue control information is provided in the register specifier field and the queue control signal is also supplied, physical registers which are different in the reading mode and the writing mode are selected.

When one logical register is designated, therefore, one physical register is selected from a plurality of physical registers of the corresponding register queue. Thus, the number of registers which can actually used can be increased than the number of registers which can be designated.

A data processor, where the number of registers are increased by the different structure, is disclosed in U.S. patent application Ser. No. 07/979327 filed Nov. 20, 1992 by Fujii et al.

BRIEF DESCRIPTION OF THE DRAWINGS

FIG. 1 is a diagram showing a construction of a processor according to the invention;

DESCRIPTION OF THE PREFERRED EMBODIMENTS

Figure 2:
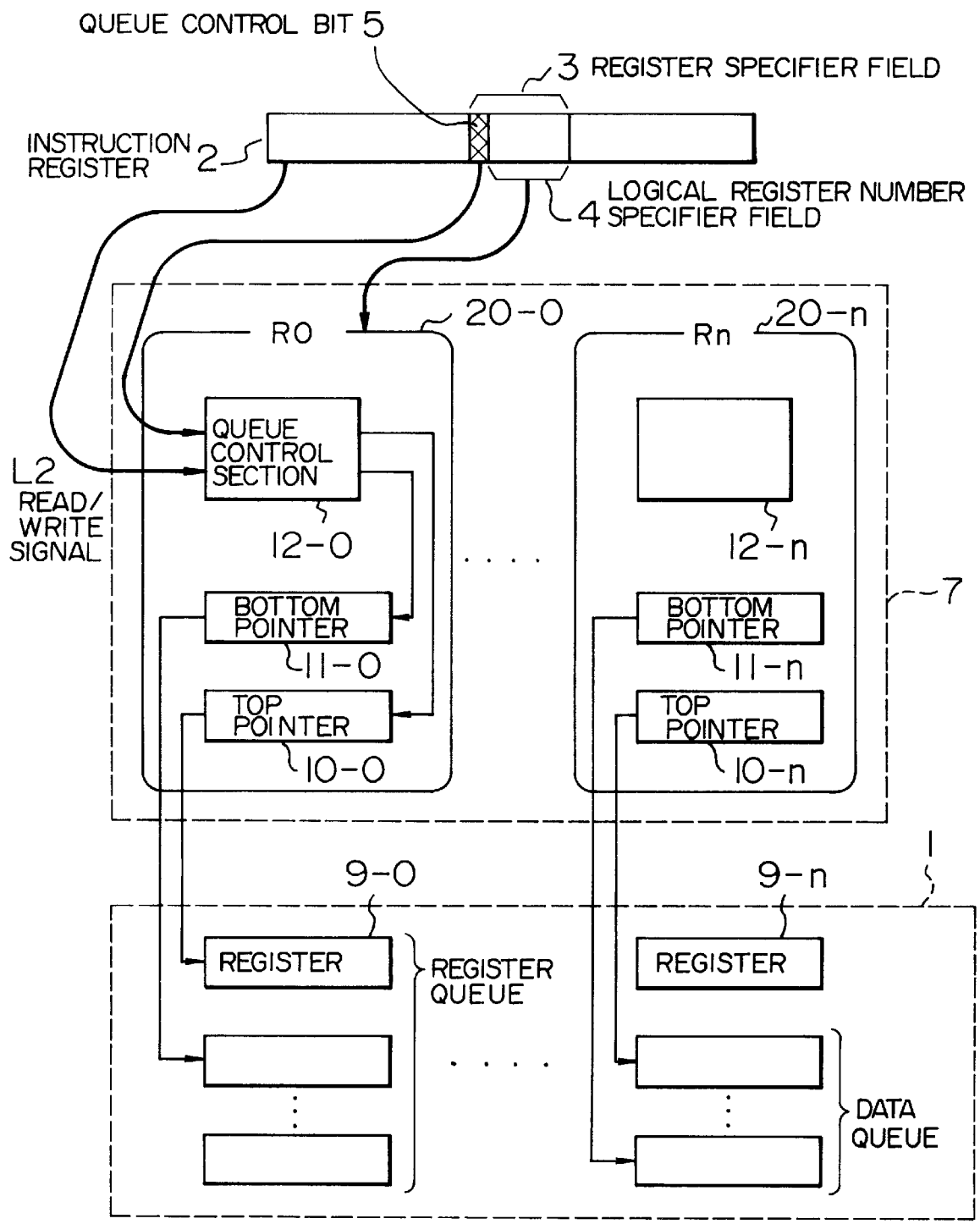
FIG. 2 is a conceptual diagram for explaining a role of a physical register number forming section.

An embodiment of the invention will now be described with reference to the drawings.

(1) Outline of an Apparatus

FIG. 1 is a diagram showing a construction of a processor according to the embodiment of the invention.

In FIG. 1, an instruction register 2 holds an instruction which is fetched from a memory 17 by a fetch circuit (not shown). An instruction control section 6 receives a signal from the instruction register 2 and decodes the content and sends a control signal to the sections in the processor relative to the operation of the instruction held in the instruction register 2. A physical register group 1 is a register group of a large capacity comprising a plurality of register queues. A physical register number forming section 7 converts the logical register number that is designated by a register specifier field 3 of the instruction register 2 into a physical register number. The physical register number forming section 7 has physical register number forming units 20 (20-0 to 20-n) for register queues, the number of which is equal to the number (n+1) of logical registers. Each of the physical register number forming units 20 for register queues has a Top pointer generator 30, a Bottom pointer generator 31, a pointer modifier 32, a pointer selector 33, and a number selecting section 37.

Further, the embodiment comprises an arithmetic operating section 13, an address converting section 14, a memory access control section 15, a memory control section 16, a memory 17, and the like which the processor generally has.

(2) Instructions which are used in the Embodiment

Instructions which are used in the embodiment will be first explained prior to describing a detailed structure of the embodiment and the details of the operation.

In FIG. 1, a format of instructions which can be executed in the embodiment is shown in the instruction register 2.

In the instruction register 2, each of the register specifier fields 3 (3-1, 3-2, 3-3) designates the register and there is a case where the number of registers which are designated to the instruction differs on the kind of instruction which is stored in the instruction register 2. Whether the access to the register which is designated by the register specific field 3 relates to "reading" or "writing" is determined by the kind of instruction and the position of the register specifier field 3 in the instruction.

The register specifier fields 3 (3-1, 3-2, 3-3) are divided into logical register number specifier fields 4 (4-1, 4-2, 4-3) and queue control bits 5 (5-1, 5-2, 5-3). Each of the logical register number specifier fields 4-1, 4-2, and 4-3 comprises, for example, five bits. Each of the queue control bits 5-1, 5-2, and 5-3 comprises, for example, one bit. The register number (for example, "00000") which is designated by the logical register number specifier fields 4 (4-1, 4-2, 4-3) has the same meaning as that of the register number in the processor of the conventional type. However, the register number designates the number of the group (as will be explained hereinlater, according to the invention, such a group has a queue construction) comprising a plurality of registers. The queue control bits 5 designate an accessing method to the register group having a queue construction (register queues) which is designated by the logical register number specifier field 4.

As an accessing method to the register group with the queue construction which is designated by information shown by the queue control bits 5, there are two kinds of modes such as normal accessing mode and queue accessing mode. The register access in the normal accessing mode is executed for only the register existing at the top of the data queue in the register queue. In the queue accessing mode, after the value was extracted from the top of the data queue, it is eliminated from the data queue in case of "reading" and the values is added to the last of the data queue in case of "writing".

(3) Details of Structure and Operation of the Embodiment

A structure and operation of the embodiment shown in FIG. 1 will now be described in detail.

In the embodiment, since the logical register number specifier field 4 in the instruction register 2 comprises five bits, 32-logical registers can be designated.

The physical register group 1 comprises register queues of the number that is equal to the number (32 in the embodiment) of logical registers. Each register queue is constructed by a plurality of (six in the embodiment) physical registers.

The logical register number designated by the logical register number specifier field 4 in the instruction register 2 is converted into the physical register number by the physical register number forming section 7.

A construction and operation of the physical register number forming section 7 will now be described hereinbelow.

The physical register number forming section 7 comprises the physical register number forming units 20 (20-0, - - - , 20-n) for register queues prepared in correspondence to the logical register numbers. Reference numeral 20-0 denotes the physical register number forming unit for an $R_0$ register queue and 20-n indicates the physical register number forming unit for an $R_n$ register queue. In the case where each of the logical register number specifier fields 4-1, 4-2, and 4-3 comprises five bits, the number of physical register number forming units for register queues is set to 32.

The physical register number forming section 7 decides the physical register as a target to be accessed from the logical register number and queue control information in the register specifier field 3, and read/write information. The read/write information is information to designate whether data is read out from the target register or the data is written into the register. The read/write information is decided by the kind of instruction and the position of the field to designate the register in the instruction.

In the case where the instruction has three register specifier fields, three physical registers are determined. Further, the physical register number forming section 7 executes a management and a control of the queue corresponding to each logical register by using the logical register number, queue control information, read/write information, and a pointer modify timing signal $L_5$ which is produced by the instruction control section 6.

The logical register number is decoded by the instruction control section 6 and is transferred to the physical register number forming section 7 as a logical register selection signal $L_4$ ($L_{4-1}$, $L_{4-2}$, $L_{4-3}$). Similarly, the queue control information is decoded by the instruction control section 6 and is transferred to the physical register number forming section 7 as a queue control signal $L_3$ ($L_{3-1}$, $L_{3-2}$, $L_{3-3}$). A read/write signal $L_2$ as a signal for judgment of the reading/writing operation of the register access is also produced by the instruction control section 6 for every logical register and is transferred to the physical register number forming section 7.

That is, total three logical register selection signal lines are extended from the instruction control section 6 to the physical register number forming units for register queues corresponding to the logical register numbers in a manner such that one logical register selection signal line corresponds to each of the logical register number specifier fields 4-1, 4-2, and 4-3 for each logical register number. In the case where each of the logical register number specifier field comprises five bits, a set of three exclusive-use logical register selection signal lines are arranged for each of the 32 physical register number forming units for register queues. The number of signal lines is determined by the number of operands in the instructions which are handled by the data processor. In the embodiment, since all of the instruction have at the most three operands, the number of signal lines is equal to 3.

Figure 9:
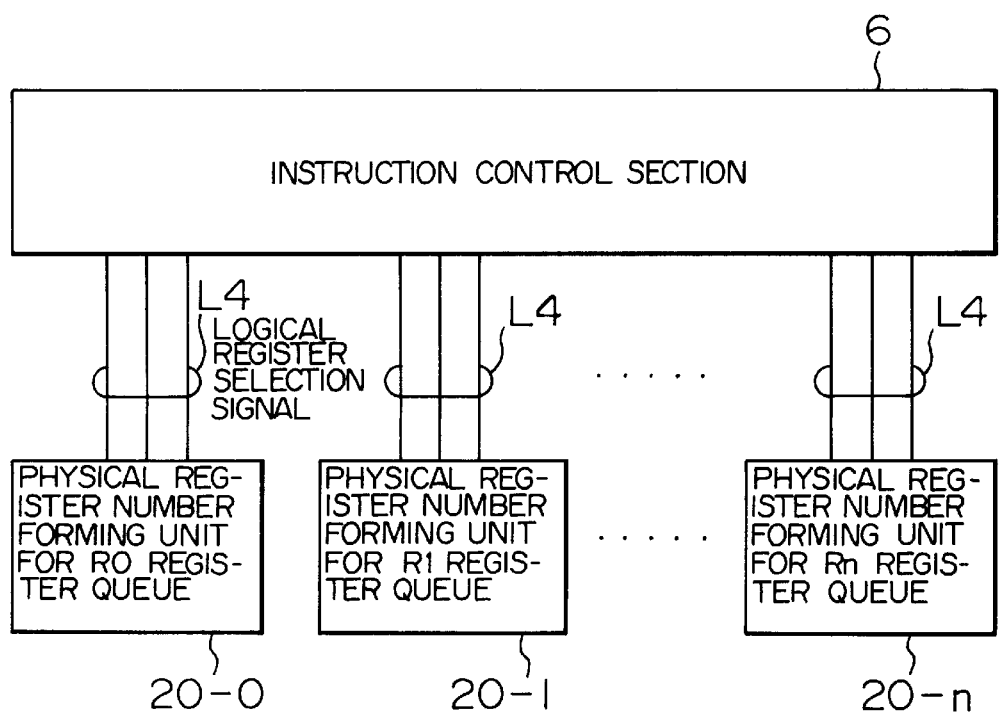
FIG. 9 is a diagram for explaining a state of wires of logical register selection signal lines.

FIG. 9 shows a diagram for explaining such a state. The signals $L_2$, $L_3$, and $L_5$ are commonly sent to all of the physical register number forming units for register queues.

The physical register number decided by the physical register number forming section 7 is transferred to the physical register group 1 as a physical register selection signal $L_6$.

Each physical register number forming unit 20 for register queue in FIG. 1 comprises the generator 30 to generate the first pointer, generator 31 to generate the second pointer, pointer modifier 32, pointer selector 33, number selecting section 37, and the like. In the embodiment, the first and second pointers are respectively called a Top pointer and a Bottom pointer. The generators 31 and 32 are respectively called a Top pointer generator and a Bottom pointer generator. Each of the physical register number forming units 20 receives the signals $L_2$, $L_3$, $L_4$, and $L_5$ from the instruction control section 6 as inputs and generates the signal $L_6$ as a final output of the physical register number forming section 7.

Three $L_2$ signals and three $L_3$ signals are connected to each physical register number forming unit 20 for register queue. Three exclusive-use $L_4$ signals are connected to each physical register number forming unit 20. Those three signals correspond to three register specifier fields 3 existing in the instruction register 2, namely, three operands (logical registers) in the instruction, respectively. Therefore, the signals $L_2$, $L_3$, and $L_4$ regarding the same operand (logical register) function as a set.

A detailed construction of each physical register number forming unit 20 for register queue will now be described hereinlater with reference to FIG. 3. Functions which are realized by the physical register number forming section 7 will now be described as concept with reference to FIG. 2 is a conceptual diagram showing the roles of the physical register number forming section 7.

The physical register group 1 has register queues 9-0 to 9-n corresponding to the logical registers. The physical register number forming section 7 has the physical register number forming units 20-0 to 20-n for register queue corresponding to the logical registers. The register queue stores and erases data by an FIFO (First-In First-Out) method. That is, a data queue is constructed in the register queue. A top pointer 10 (10-0, - - -, 10-n) indicates the top of the data queue. A bottom pointer 11 (11-0, - - -, 11-n) indicates the bottom of the data queue. The two pointers are generated by the Top pointer generator 30 and Bottom pointer generator 31 in FIG. 1, respectively. A queue control section 12 (12-0, - - -, 12-n) controls the above two pointers in accordance with an input signal.

The queue control section 12 forms the physical register selection signal $L_6$ by using the signals $L_2$, $L_3$, $L_4$, and $L_5$ mentioned above. The queue control section 12 comprises the pointer modifier 32, pointer selector 33, and number selecting section 37 in FIG. 1.

Figure 3:
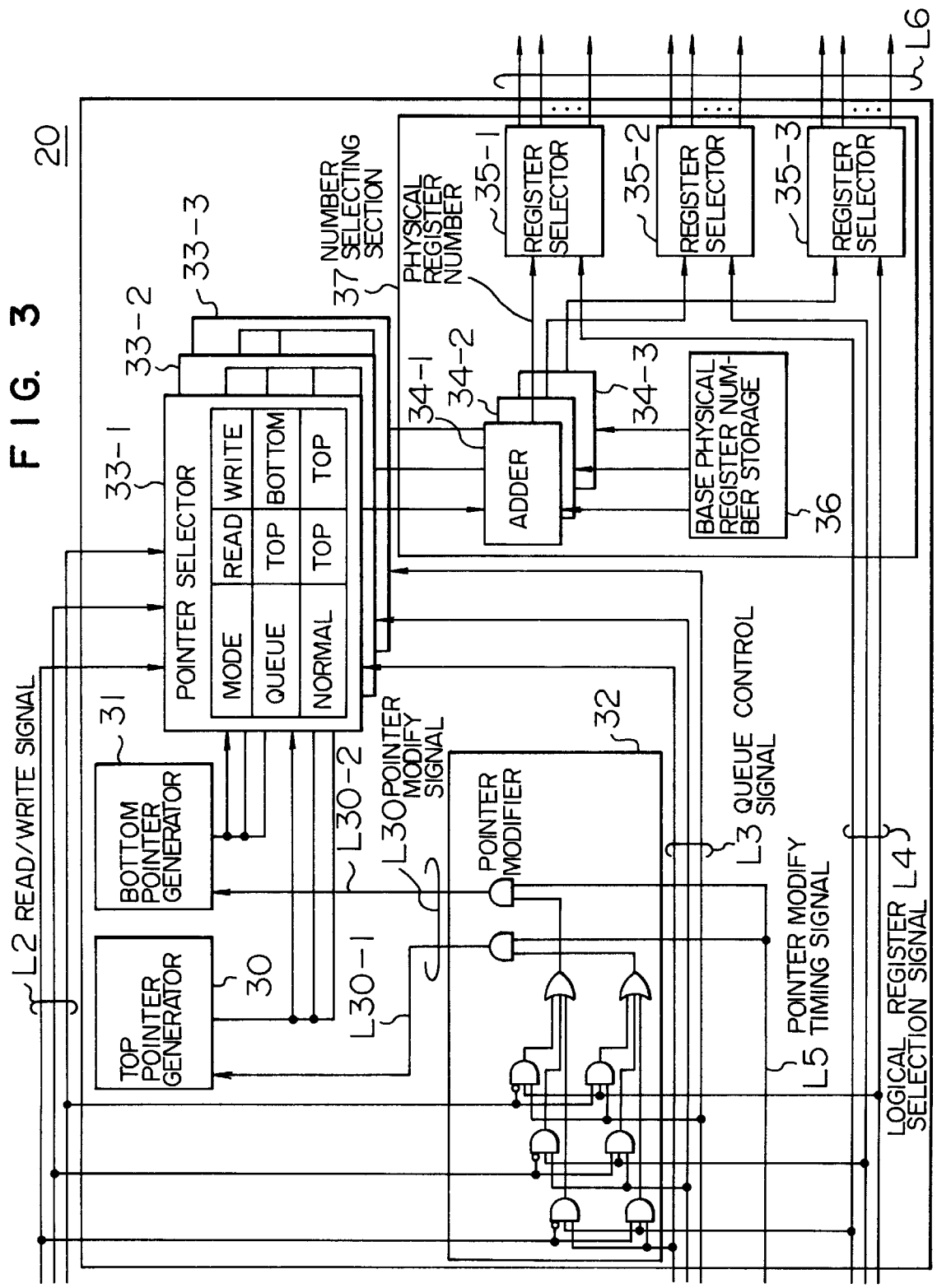
FIG. 3 is a diagram showing a construction of a physical register number forming section for a register queue.

FIG. 3 shows a construction of a physical register number forming unit for an $R_i$ register queue as one of a plurality of physical register number forming unit 20.

Reference numeral 30 denotes the Top pointer generator and is a circuit including the Top pointer indicative of the top of the data queue shown by 10 in FIG. 2. The number of the top register in the data queue is always held in the Top pointer generator 30 as a Top pointer in the relative value from the top of the register queue. Specifically speaking, for example, in the case where the register queue comprises six registers, the Top pointer is set to a value of 0 to 5. Further, the Top pointer generator 30 updates the value of the Top pointer in accordance with the accessing mode to the register queue, namely, the queue control information and read/write information.

Similarly, reference numeral 31 denotes a Bottom pointer generator and is a circuit including the Bottom pointer indicative of the bottom of the data queue shown by 11 in FIG. 2. The number of the last register in the data queue is always held in the Bottom pointer generator 31 as a Bottom pointer in the relative value from the top of the register queue. Specifically speaking, for example, in the case where the register queue comprises six registers, the Bottom pointer has a value of 0 to 5. Further, the Bottom pointer generator 31 updates the value of the Bottom pointer in accordance with the accessing mode to the register queue.

Reference numeral 32 denotes the pointer modifier and generates a signal $L_{30}$ ($L_{30-1}$, $L_{30-2}$) to promote the updating of the pointer to the Top pointer generator 30 or the Bottom pointer generator 31 in accordance with whether the register queue which is managed by the physical register number forming unit 20 for the register queue has been accessed in the queue accessing mode or not.

The pointer modifier 32 receives the read/write signal $L_2$, queue control signal $L_3$, and logical register selection signal $L_4$ as inputs.

Each of the read/write signals, existing in the correspondence to each of the three logical register number specifier fields, is set to "1" in the reading mode and to "0" in the writing mode.

Likewise, each of the queue control signals, existing in correspondence to each of the three logical register number specifier fields, is set to "1" in the queue accessing mode and to "0" in the ordinary accessing mode.

Each of the logical register selection signals, existing in correspondence to each of the three logical register number specifier fields, is set to "1" in the case where the logical register number allocated to the physical register number forming unit 20 for the $R_i$ register queue has been designated in the corresponding logical register number specifier field. When such a logical register number is not designated, the logical register selection signal is set to "0".

With respect to either one of or all of the three operands in the instructions, when $L_2$ indicates "reading", namely, "1", and $L_3$ indicates that the queue accessing mode, that is, "1", and $L_4$ indicates that the logical register allocated to the physical register number forming unit for the $R_i$ register queue, namely "1", and when the pointer modify timing signal $L_5$ is the effective signal, that is, when "1" is transferred, the pointer modify signal of $L_{30-1}$ is transmitted to the Top pointer generator 30. The Top pointer generator 30 which received the pointer modify signal of $L_{30-1}$ updates the value of the Top pointer provided in the generator 30.

Similarly, with respect to either one of or all of the three operands in the instructions, when $L_2$ indicates "writing", namely, "0", $L_3$ indicates the queue accessing mode, namely, "1", and $L_4$ indicates that the logical register allocated to the physical register number forming unit for the $R_i$ register queue has been selected, namely, "1", and when the pointer modify timing signal $L_5$ is the effective signal, that is, when the "1" is transferred, the pointer modify signal of $L_{30-2}$ is transmitted to the Bottom pointer generator 31. The Bottom pointer generator 31 which received the pointer modify signal of $L_{30-2}$ updates the value of the Bottom pointer provided in the generator 31.

The effective pointer modify timing signal $L_5$ is transmitted from the instruction control section 6 in FIG. 1 after completion of the conversion from the logical register number into the physical register number by the physical register number forming section 7.

The updating of the Top pointer and the Bottom pointer is accomplished by increasing the value of the Top pointer in the Top pointer generator 30 or the Bottom pointer in the Bottom pointer generator 31 by "1" (or by decreasing those values by "1" in accordance with an embodiment).

For example, assuming that the register queue comprises six registers and the value of the pointer was equal to 5 before updating, the value of the pointer after the updating is set to 0. In case of employing the method of decreasing the value of the pointer one by one, the pointer value which was equal to 0 before updating is set to 5 after the updating. That is, the register queue is cyclically used by using the two pointers.

The pointer selector 33 (33-1, 33-2, 33-3) is a circuit to decide which one of the registers of the register queue should be accessed in the access to a certain logical register.

Such a pointer selector is also prepared for each operand of the instruction and receives the read/write signal $L_2$ and queue control signal $L_3$ corresponding to the operand as inputs. Further, the pointer selector receives the value of the Top pointer as an output of the Top pointer generator 30 and the value of the Bottom pointer as an output of the Bottom pointer generator 31 as selection values. Subsequently, the pointer selector selects and generates the pointer value as a relative number in the register queue to be accessed on the basis of a table as shown by 33 in FIG. 3.

The outputted pointer values are added by adders 34 (34-1, 34-2, 34-3) to a base physical register number which is a value as a base in the physical register numbers of the registers constructing the register queue and which is allocated to each physical register number forming unit for the register queue.

In the case where each register queue has six registers, 0, 6, 12, 18, 24, and so on (multiples of 6) have been stored in each base physical register number storage 36 respectively.

The adder 34 consequently generates a physical register number for every operand and is inputted to register selector 35 (35-1, 35-2, 35-3) for each operand.

When the logical register selection signal $L_4$ corresponding to the operand is effective, the register selector 35 makes the selection signal $L_6$ for the physical register corresponding to the physical register number effective.

It is now assumed that the physical register numbers of the physical registers constructing one register queue are continuous. The base physical register number storage 36 has the minimum value among the physical register numbers of the physical registers constructing the register queue.

As shown in the table in 33 in FIG. 3, only when writing into the logical register in the queue accessing mode, the value of the Bottom pointer is selected. In the other cases, namely, when reading or writing in the normal accessing mode and reading in the queue accessing mode, the value of the Top pointer is selected.

(4) Operation in the Que Accessing Mode

As mentioned above, the physical register group can be used by two kinds of methods in accordance with the value of the queue control bit in the register specifier field. The operation of the register queue when the control bit is equal to "1", namely, in the queue accessing mode will now be described.

Figure 5:
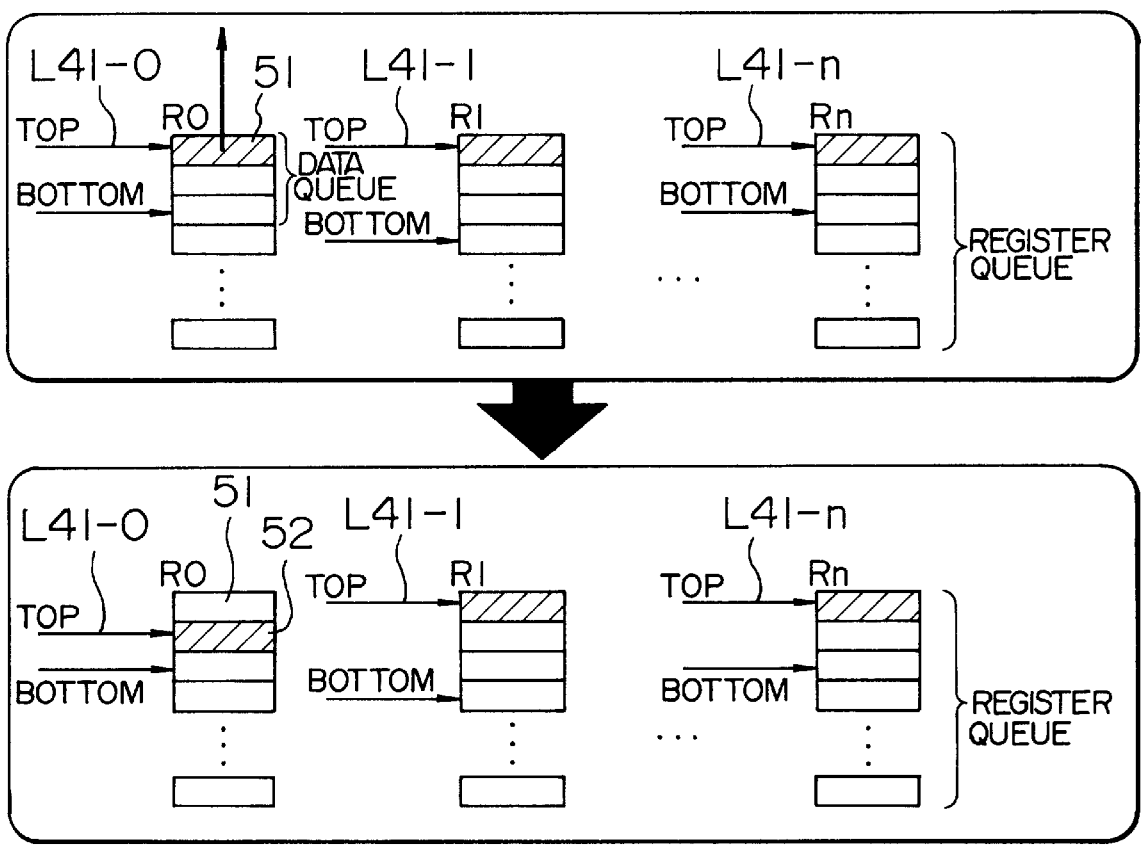
FIG. 5 is a diagram for explaining a state of an operation to read out values from registers in a queue accessing mode.

FIG. 5 shows a reading state from the register in the queue accessing mode. As shown in the upper half portion in FIG. 5, when it is now assumed that the reading operation occurred in the queue accessing mode of $R_0$ logical register, a top register 51 of the data queue in the register queue corresponding to the $R_0$ logical register is read out. The top register 51 is designated by a Top pointer $L_{41-0}$. After the top register 51 was read out, as shown in the lower half portion in FIG. 5, the top pointer $L_{41-0}$ designates a register 52 subsequent to the register 51 in the register queue. Namely, the register 52 is set to the top register of the data queue.

Figure 6:
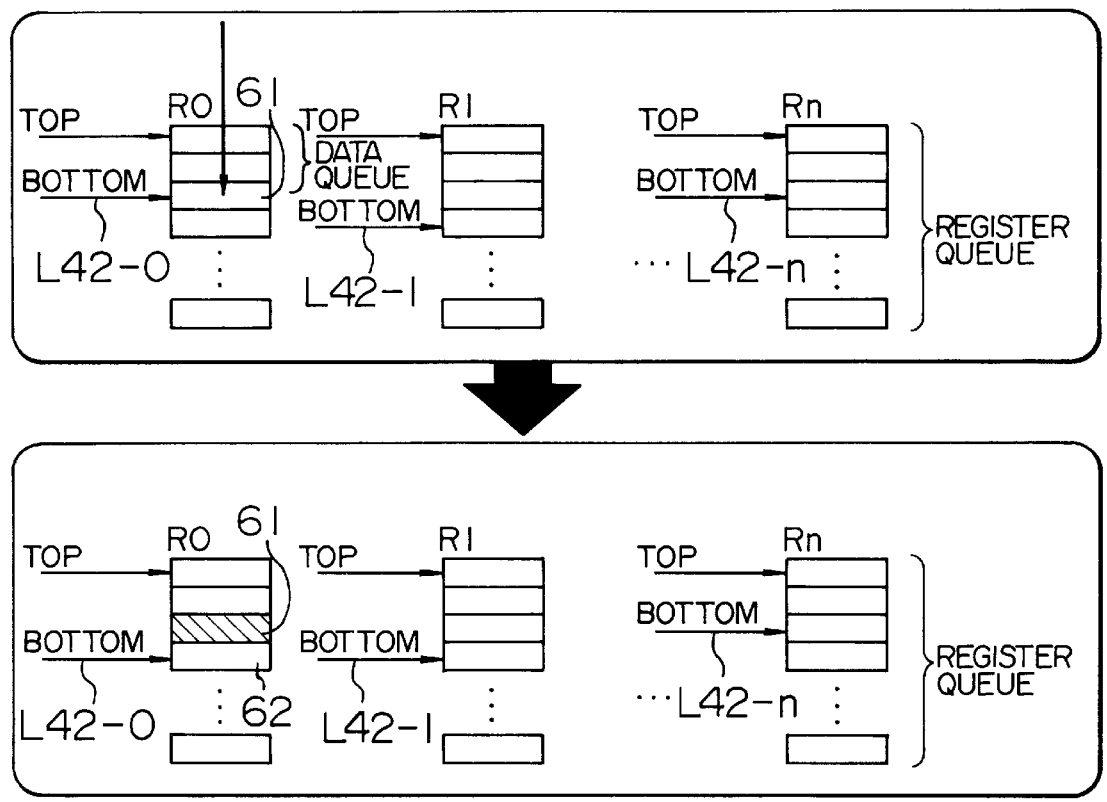
FIG. 6 is a diagram for explaining a state of an operation to write values into registers in the queue accessing mode.

FIG. 6 shows a writing state into the register in the queue accessing mode. As shown in the upper half portion in FIG. 6, when it is now assumed that the writing operation into the $R_0$ logical register was performed in the queue accessing mode, the writing operation is executed into a last register 61 of the data queue in the register queue corresponding to the $R_0$ logical register. The last register 61 is designated by a Bottom pointer $L_{42-0}$. After the writing operation was finished, as shown in the lower half portion in FIG. 6, the Bottom pointer $L_{42-0}$ indicates a register 62 subsequent to the register 61 in the register queue. Namely, the register 62 is set to the last register of the data queue.

(5) Operation in the Normal Accessing Mode

The register access when the queue control bit in the register specifier field is equal to "0", namely, in the normal accessing mode will now be described.

In the normal accessing mode, the physical register shown by the Top pointer in the register queue corresponding to the logical register number is set to a target to be accessed in both of the reading and writing modes. None of the values of the Top and Bottom pointers is updated. Therefore, only the top physical register of the data queue in the register queue is repetitively accessed.

Figure 4:
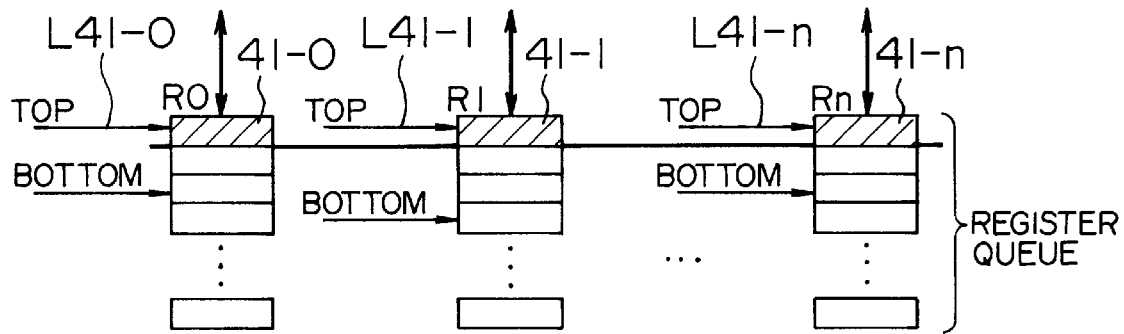
FIG. 4 is a diagram for explaining a state of a register access in an normal accessing mode.

FIG. 4 shows reading/writing states of the register in the normal accessing mode. The access to each of the logical registers $R_0, R_1, - - - , R_n$ is executed for only a top register 41 (41-0, 41-1, - - - , 41-n) of the data queue in the register queue corresponding to each physical register. The top register 41 is always designated by the Top pointer $L_{41}$ ($L_{41-0}, L_{41-1}, - - - , L_{41-n}$).

The above operations are substantially the same as those in the conventional registers. By using such a mode, the conventional software can be executed as it is in the embodiment.

(5) Processing Example in the Case where the Embodiment is Applied

As mentioned above, in the queue accessing mode, the registers in the register queue cannot be accessed and used at random. An example in which the queue accessing mode provides a good effect will now be introduced.

By using the fundamental operating patterns of the register queue shown in FIGS. 4 to 6, when the processor according to the invention executes the program, there is a possibility such that the processor can efficiently execute the processing in a form so as to preferably eliminate an influence by a memory access latency (it takes a time until the data is read out from the memory and is set into the register after the memory was accessed).

Figure 7:
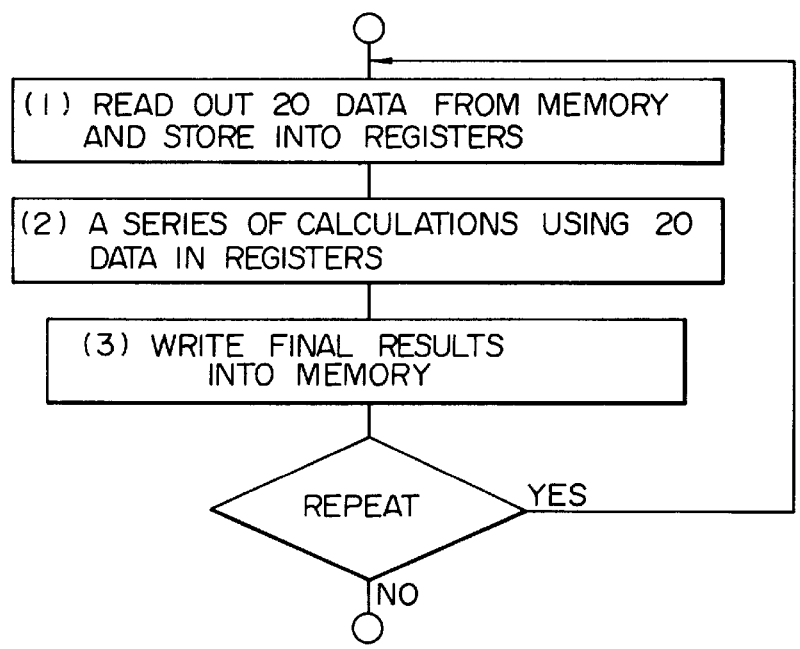
FIG. 7 is a flowchart showing an example of a program which is executed by a processor according to the invention.

For example, as shown in a flowchart of FIG. 7, it is now assumed that there is a program to repeat the following three steps: (1) 20 data are sequentially read out from the memory and stored into the different registers (LOAD); (2) a series of calculations are executed by using the 20 data in the registers (CALCULATE); and (3) and final 20 results are written into the memory (STORE).

Namely, the data is read out one by one and stored into the 20 registers. A calculation is independently executed for the data of each register. Each result is written into the memory. Subsequently, the other data is read out and stored into the 20 registers one by one. A calculation is executed to each of the data which has been stored so far in each register. Each result is written into the memory. The above operations are repetitively executed after that.

According to the conventional register structure, the same physical register could not help being used in both of the first and second loops due to the limitation of the number of physical registers, so that the processing of the second loop cannot be started until the first loop is completed. Consequently, the time that is required to access the memory is directly reflected to the executing time of the program.

In case of using the logical registers in the embodiment in the queue accessing mode, however, even when the same logical register is designated in the first and second loops, different physical registers of the same register queue are used. Thus, a part of the processings of the first and second loops can be over-lapped.

In the program, the flow of the execution of the reading operation from the memory in the above procedure (1) and the flow of the execution of the arithmetic operations and the execution of the writing operation of the result into the memory in the above procedures (2) and (3) are separately considered. In order to eliminate the influence by the memory access latency, the flow of the execution in (1) is performed precedingly to the flow of the execution in (2) and (3).

Figure 8:
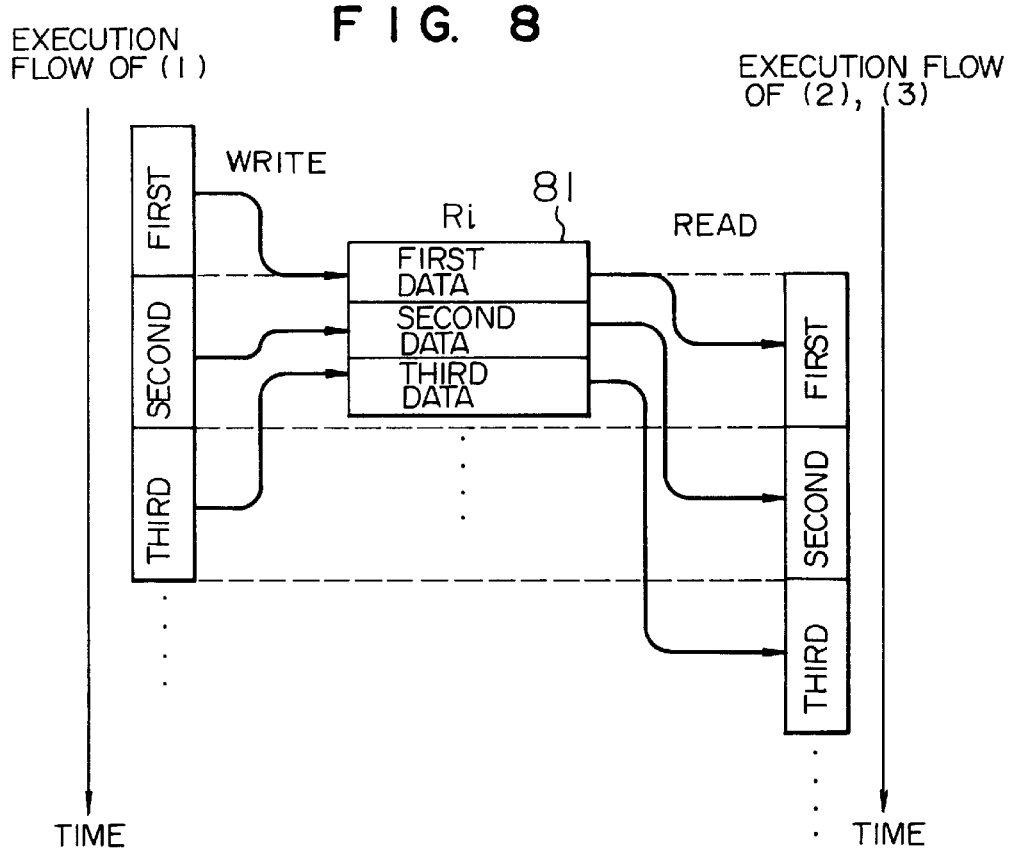
FIG. 8 is a diagram for explaining a state of an execution of the program shown in FIG. 7 by the processor according to the invention.

As shown in an example in a time chart of FIG. 8, the data read out from the memory is accumulated to the register queue each time the execution in (1) is repeated. The values are stored into the register queue corresponding to each logical register in accordance with the order from the top such that data read out from the memory as a result of the execution of the first iteration in (1), data read out from the memory as a result of the execution of the second iteration of (1), - - - - . FIG. 8 shows a state of the register queue for the logical register $R_i$ as an example. The reason why the write pointer of the data to a register queue 81 is sequentially shifted below one by one each time the execution of (1) is repeated is because the register access in (1) is performed in the queue accessing mode.

On the other hand, the execution flow in (2) and (3) uses the data accumulated in the register queue in a form such as to be delayed from the execution flow in (1). As shown in the example of the time chart of FIG. 8, in the execution of (2) and (3), the accessing point to the register queue differs each time of the iteration. That is, in the execution of the first iteration of (2) and (3), an access is executed to the top physical register of the data queue. In the execution of the second iteration, an access is executed to the next physical register. FIG. 8 shows an accessing state to the logical register $R_i$ as an example.

In the execution flow of (2) and (3), to move the access point of the register queue 81 below, it is sufficient to access the logical register in the queue accessing mode. On the contrary, in the calculation processing of (2), there is a case where it is necessary to read the same register a plurality of number of times by the processing in the same iteration. In this case, the register is accessed in the normal accessing mode to fix the access point and only the last one of the accesses to the logical register is executed in the queue accessing mode. Due to this, the access point to the register queue can be moved below. However, it is an important point that the updating of the pointer to the register queue can be performed for every logical register. Consequently, for example, during the execution of the first iteration of (2) and (3), with respect to a certain logical register, the data to be used for the execution at the second iteration of (2) and (3) can be referred.

Such a switching operation of the queue accessing mode can be instructed by the user or can be also performed by a compiler.

When the above nature is used, the program can be more efficiently executed by preferably scheduling so as to overlap the execution of each iteration of the execution flow of (2) and (3) in the time chart of FIG. 8.

In the example described with reference to FIGS. 7 and 8, the execution flow of (1) has been precedent to the execution flow of (2) and (3). By setting a preceding degree to a value such as to eliminate the influence by the memory access latency, the efficient execution of the program can be expected. On the other hand, by performing instruction level parallel processings in the processor, the further efficient execution of the program can be expected.

Moreover, the processor according to the invention, the influence by an arithmetic operation latency can be also eliminated by using the mechanism of the register queue. For example, by writing the result of the execution of the arithmetic operation instruction which needs a few machine cycles into the logical registers in the queue accessing mode, the logical registers to be written is prevented from being occupied without being used for a few machine cycles. It is sufficient that the register in which the result of the arithmetic operation was written as mentioned above is moved to the top of the data queue in the register queue until the time point at which the operation result is used or necessary. It is possible to performing the scheduling for such a purpose. By overlapping the repetitions of such operations, the vain operation due to the influence by the arithmetic operation latency of the processor can be eliminated.

In the processor according to the invention, even in case of executing processings such that the values on the registers which will be necessary later are once written into the memory and are read out when they are needed again due to the lack of the number of registers in the conventional type of processor, by using the writing operation into the registers in the queue accessing mode, the necessary values can be held in the register. By scheduling appropriately the accessing operations to the register, those necessary values can be again used without storing to the memory. With the above construction, the number of memory accessing times in the execution of the program can be reduced and an efficient processing can be expected.

(6) Modification

In the embodiment, although the number of physical registers in each register queue has been set to 6, it can be selected to the optimum number in accordance with the nature of the data to be processed or the conditions on design of the hardware.

In the embodiment, the adder and the base physical register number storage have been provided for the number selecting section of each of the physical register number forming units for register queues. However, when different predetermined values are given to the Top and Bottom pointers of each physical register number forming unit for register queue, there is no need to provide the adder and base physical register number storage for the number selecting section.

(7) Effects of the Invention

According to the invention, since the number of registers which can be actually used is larger than the number of registers which can be designated in the instruction, the problem of the lack of registers which occurs in the numerical application or the like can be solved.

By using a part of a number of registers as a temporary memory area, the deterioration of the performance due to the influence by the memory access latency can be also reduced.

Moreover, the processor according to the invention keeps the compatibility with the architecture of the processor based on the conventional technique and its hardware scale can be also held to a level such that the hardware can be constructed of the microprocessor.

What is claimed is:

1. A data processor comprising:

a plurality of register queues each comprised of physical registers, each register queue having a queue number unique in the data processor and each physical register having a physical number unique in the data processor; and a physical register number forming means, connected to said plurality of register queues, for converting a logical register number designated in an instruction into a physical register number, said logical register number indicating a queue number, the physical register having the physical register number belonging to the register queue having the logical register number, and for transferring said physical register number to said plurality of register queues, the physical register having the physical register number being used for executing the instruction.

2. A data processor according to claim 1, further comprising:

an instruction register, connected to said physical register number forming means, to temporarily store said instruction having a plurality of register number specifier fields to designate a logical register number, wherein each of the register number specifier fields in said instruction includes a logical register number specifier field to designate the logical register number and queue control information to designate an accessing method of the register queue, said physical register number forming means changes a method of converting from the logical register number into the physical register number by the queue control information.

3. A data processor comprising:

an instruction control means for decoding an instruction;

a data register group having a plurality of register queues with respect to logical register numbers designated by said instruction, each of said register queues comprising a plurality of physical registers, each of said physical registers having an unique physical number in said data register group;

a physical register number forming means, connected to said instruction control means and said data register group, for converting the logical register number designated by the instruction and decoded by said instruction control means into a physical register number corresponding to a register queue and for transferring said physical register number to said data register group; and an instruction register, connected to said physical register number forming means, to temporarily store said instruction having a plurality of register number specifier fields to designate a logical register number, wherein each of the register number specifier fields in said instruction includes a logical register number specifier field to designate the logical register number and queue control information to designate an accessing method of the register queue, said physical register number forming means changes a method of converting from the logical register number into the physical register number based on the queue control information;

wherein said queue control information indicates one of a normal accessing mode and a queue accessing mode, said physical register number forming means forms the physical register number of a top of a data queue for queuing data included within the register queue corresponding to the designated logical register number, when said queue control information indicates the normal accessing mode, when said queue control information indicates the queue accessing mode, in case of writing data into register, said physical register number forming means forms the physical register number so as to be added to a bottom of the data queue in the register queue corresponding to the designated logical register number, when reading out data from register, the physical register number forming means forms the physical register number corresponding to a top of the data queue in the register queue corresponding to the designated logical register number, and after the data is read out from said physical register, the data is deleted from the top of the data queue.

4. A data processor comprising:

an instruction control means for decoding an instruction;

a data register group having a plurality of register queues with respect to logical register numbers designated by said instruction, each of said register queues comprising a plurality of physical registers, each of said physical registers having an unique physical number in said data register group;

a physical register number forming means, being connected to said instruction control means and said data register group, for converting the logical register number designated by the instruction and decoded by said instruction control means into a physical register number corresponding to a register queue and for transferring said physical register number to said data register group; and an instruction register, connected to said physical register number forming means, to temporarily store said instruction having a plurality of register number specifier fields to designate a logical register number, wherein each of the register number specifier fields in said instruction includes a logical register number specifier field to designate the logical register number and queue control information to designate an accessing method of the register queue, said physical register number forming means changes a method of converting from the logical register number into the physical register number based on the queue control information;

wherein said queue control information indicates one of normal accessing mode and a queue accessing mode, said physical register number forming means forms the physical register number of a top of a data queue for queuing data included within the register queue corresponding to the designated logical register number, when said queue control information indicates the normal accessing mode, when said queue control information indicates the queue accessing mode, in case of writing data into register, said physical register number forming means forms the physical register number so as to be added to a bottom of the data queue in the register queue corresponding to the designated logical register number, when reading out data from register, the physical register number forming means forms the physical register number corresponding to a top of the data queue in the register queue corresponding to the designated logical register number, r and after the data is read out from said physical register, the data is deleted from the top of the data queue;

wherein said physical register number forming means includes two pointers and a queue control section with respect to each of said register queues and, in order to use the register queue as a cyclic data queue, said two pointers indicate the top and bottom of the data queue, and said queue control section updates the pointers.

5. A data processor comprising:

an instruction register for temporarily storing an instruction, in which at least one register specifier field is provided, said register specifier field having a logical register number specifier field and queue control information as a pair;

an instruction decoder, connected to said instruction register, for decoding the instruction in the instruction register;

a plurality of register queues with respect to said logical register numbers, each of said register queues comprising a plurality of physical registers; and a physical register number forming means connected to said instruction decoder and said register queues, wherein said instruction decoder decodes the instruction in said instruction register, and generates a read/write signal, a logical register selection signal, and a queue control signal in correspondence to said register specifier field, and supplies those signals to said physical register number forming means, and said physical register number forming means updates a pointer to designate the physical register from the register queue indicated by the logical register number on the basis of said read/write signal, logical register selection signal, and queue control signal and selects the physical register on the basis of said pointer.

6. A data processor according to claim 5, wherein said physical register number forming means has a pointer modifier, a first pointer generator, a second pointer generator, pointer selectors provided in correspondence to said register specifier fields, and a number selecting section, with respect to each logical register number, said pointer modifier generates a first or second pointer modify signal on the basis of said read/write signal, said queue control signal, and said logical register selection signal, said first pointer generator and said second pointer generator respectively receive said first and second painter modify signals and modify said first and second pointers, said pointer selector selectively outputs either one of the first and second pointers on the basis of said read/write signal and said queue control signal, said number selecting section has register selectors in correspondence to said register specifier field, and each of said register selectors receives the logical register selection signal of said corresponding logical register number specifier field and the pointer from said corresponding pointer selector, and outputs a physical register number.

7. A data processor according to claim 6, wherein said number selecting section has a storage for storing a base physical register number and an adder provided for each of said pointer selectors, and said adder adds a number designated by the pointer from the corresponding pointer selector and said base physical register number, and outputs the result of the addition to said register selector.

8. A data processor according to claim 7, wherein said instruction decoder generates and outputs a pointer modify timing signal to decide the timing to update the pointer of said physical register number forming means to said physical register number forming means.

9. A data processor according to claim 6, wherein said physical register number forming means generates a first pointer modify signal when receiving said logical register selection signal, said read signal, and said queue control signal and said physical register number forming section forms a second pointer modify signal when receiving said logical register selection signal, said write signal, and said queue control signal.

10. A data processor comprising:

a plurality of register queues each comprised of physical registers, each register queue having a queue number unique in the data processor and each physical register having a physical number unique in the data processor;

a register number conversion circuit connected to said plurality of register queues; and a calculation circuit;

wherein said register number conversion circuit converts a logical register number designated in an instruction into the physical register number, said logical register number indicating the queue number, the physical register having the physical register number belonging to the queue having the logical register number, and transfers said physical register number to said plurality of register queues, and the calculation circuit accesses the physical register having the physical register number to execute the instruction.

11. A data processor according to claim 10, further comprising:

an instruction register connected to said physical register number forming means, to temporarily store said instruction having a plurality of register number specifier fields to designate a logical register number, wherein each of the register number specifier fields in said instruction includes a logical register number specifier field to designate the logical register number and queue control information to designate an accessing method of the register queue, said register number conversion circuit changes a method of converting from the logical register number into the physical register number by the queue control information.

12. A data processor comprising:

a plurality of register queues each comprised of physical registers, each register queue having a queue number unique in the data processor and each physical register having a physical number unique in the data processor;

a register number conversion circuit connected to said plurality of register queues;

a calculation circuit;

wherein said register number conversion circuit converts a logical register number designated in an instruction into the physical register number, said logical register number indicating the queue number, the physical register having the physical register number belonging to the queue having the logical register number, and transfers said physical register number to said plurality of register queues, and the calculation circuit accesses the physical register having the physical register number to execute the instruction; and an instruction register connected to said physical register number forming means, to temporarily store said instruction having a plurality of register number specifier fields to designate a logical register number, wherein each of the register number specifier fields in said instruction includes a logical register number specifier field to designate the logical register number and queue control information to designate an accessing method of the register queue, said register number conversion circuit changes a method of converting from the logical register number into the physical register number by the queue control information;

wherein said queue control information includes a normal accessing mode and a queue accessing mode, said register number conversion circuit forms the physical register number of a top of a data queue for queuing data included within the register queue corresponding to the designated logical register number, when said queue control information indicates the normal accessing mode, when said queue control information indicates the queue accessing mode, in case of writing data into register, said physical register forming means forms the physical register number so as to be added to a bottom of the data queue in the register queue corresponding to the designated logical register number, when reading out data from said register, the physical register number forming means forms the physical register number corresponding to a top of the data queue in the register queue corresponding to the designated logical register number, and after the data is read out from said physical register, the data is deleted from the top of the data queue.

13. A data processing according to claim 12, wherein said register number conversion circuit includes two pointers and a queue control section with respect to each of said register queues and, in order to use the register queue as a cyclic data queue, and said two pointers indicate the top and bottom of the queue, and said queue control section updates the pointers.

* * * * *